US00RE38634E1

(19) United States
(12) Reissued Patent
Westerhof et al.

(10) Patent Number: US RE38,634 E
(45) Date of Reissued Patent: Oct. 26, 2004

(54) SYSTEM APPLIANCE AND CARTRIDGE FOR PERSONAL BODY CARE

(75) Inventors: Willem A. Westerhof, Drachten (NL); Schelte Heeringa, Drachten (NL)

(73) Assignee: Koninklijke Philips Electronics N.V., Eindhoven (NL)

(21) Appl. No.: 10/272,891

(22) Filed: Oct. 17, 2002

Related U.S. Patent Documents

Reissue of:
(64) Patent No.: 6,131,288
Issued: Oct. 17, 2000
Appl. No.: 09/092,312
Filed: Jun. 5, 1998

(30) Foreign Application Priority Data

Jun. 5, 1997 (EP) ..... 97201704

(51) Int. Cl.[7] ..... B26B 19/40
(52) U.S. Cl. ..... 30/41; 30/538; 30/541
(58) Field of Search ..... 222/153.03, 372; 30/41, 538, 541, 125; 401/133, 268, 282

(56) References Cited

U.S. PATENT DOCUMENTS 2,686,361 A * 8/1954 Resnick et al. ..... 30/41
5,092,041 A * 3/1992 Podolsky ..... 30/41
5,402,697 A * 4/1995 Brooks ..... 83/18
6,349,854 B1 * 2/2002 Bierend et al. ..... 222/153.11

* cited by examiner

*Primary Examiner*—Douglas D. Watts
(74) *Attorney, Agent, or Firm*—Ernestine C. Bartlett

(57) ABSTRACT

The system comprises, for example, an electric shaver (1) and a cartridge (2) mounted in a chamber (12) of the shaver (1). The shaver (1) comprises a shaving head (3) having drivable cutters (31) and an electric motor (11) for driving the cutters (31) via a coupling pin (14). The cartridge (2) comprises a reservoir (25) for holding an auxiliary fluid. This auxiliary fluid may, for example, serve to reduce the friction between the shaving head (3) and the skin of a user. The cartridge (2) has an outlet channel (22) and a diaphragm pump (23) for feeding the auxiliary fluid from the reservoir (21) to the outlet channel (22). For the actuation of the diaphragm pump (23) the shaver (1) comprises a button (15) and a lever (17) which is pivotable about a pivot (18). When the button (15) is pressed the diaphragm pump (23) is actuated and a small amount of the auxiliary fluid is applied to the skin of a user via an outlet opening (32). The cartridge (2) has a key (50) which cooperates with a blocking device (60), which is adapted to block the lever (17) by means of pins. The key (50) has projections for positioning the pins of the blocking device (60). In the absence of the correct key the lever (17) is blocked and thus prevents the auxiliary fluid in the cartridge from being pumped to the outlet opening (32).

18 Claims, 5 Drawing Sheets

SYSTEM APPLIANCE AND CARTRIDGE FOR PERSONAL BODY CARE

Matter enclosed in heavy brackets [ ] appears in the original patent but forms no part of this reissue specification; matter printed in italics indicates the additions made by reissue.

BACKGROUND OF THE INVENTION

The invention relates to a system suitable ;or personal body care, comprising a cartridge having a space for storing an auxiliary fluid, and an appliance comprising a treatment device for carrying out a treatment on the body of a user with the aid of the auxiliary fluid, and an interface for coupling the cartridge to the appliance.

The invention also relates to an appliance for body care, comprising a treatment device for carrying out a treatment on the body of a user, and an interface for coupling a cartridge to the appliance, which cartridge has a space for storing an auxiliary fluid.

The invention also relates to a cartridge comprising a space for the storage of an auxiliary fluid intended for personal body care in conjunction with a body-care treatment, an interface for coupling the cartridge to an appliance adapted to carry out said treatment.

The invention also relates to a pump and a flange for use in the cartridge in accordance with the invention.

Such a system, such an appliance and such a cartridge are known from U.S. Pat. No. 5,402,697. The known system comprises an electric shaver and a cartridge filled with a depilatory substance. The shaver has a shaving head, a drive unit and a chamber for mounting the cartridge. Viewed from the shaving head the chamber is located adjacent the drive unit and, at the shaver side remote from the shaving head, it has a cover to enable the cartridge to be placed into the chamber. At the shaving head side the chamber communicates with a passage which terminates in the outer surface of the shaving head. The cartridge has an actuating button to apply the depilatory substance. The cover has an opening through which a user has access to the button in the closed position of the cover once the cartridge has been placed into the shaver. A drawback of the known system is that the shaver can be used in conjunction with a cartridge containing a fluid which has not been tested in combination with the shaver.

SUMMARY OF THE INVENTION

It is an object of the invention to provide a system, an appliance and a cartridge of the types defined in the opening paragraphs, which preclude undesired results owing to the use of an unsuitable auxiliary fluid.

To this end the system in accordance with the invention is characterized in that the appliance includes a blocking device adapted to block at least one function of the appliance, the cartridge has a key for cooperation with the blocking device, and the blocking device is adapted to unblock said function when the cartridge is mounted.

The appliance in accordance with the invention is suitable for use in the system in accordance with the invention and to this end it is characterized in that the appliance includes a blocking device adapted to block at least one function of the appliance, and the blocking device is adapted to unblock said function when a cartridge having a key is coupled to the appliance.

The cartridge in accordance with the invention is suitable for use in the system in accordance with the invention and to this end it is characterized in that the cartridge has a key for unblocking a function of the appliance when the cartridge is coupled to the appliance.

The invention is based on the recognition of the fact that the use of an auxiliary fluid in conjunction with an appliance which performs a body-care treatment on the body of a user imposes special requirements on the auxiliary fluid. It is not sufficient that the auxiliary fluid as such is suitable for application to the body. It appears that the effect on the body can change under the influence of the treatment. In addition, the auxiliary fluid should be easy to remove from the appliance and the auxiliary fluid should not affect the appliance. The measures in accordance with the invention inhibit a function which could give an undesired result when a cartridge without the correct key is present. Protection against undesired results is achieved in that cartridges having the correct key are filled exclusively with fluids that have been tested in conjunction with the appliance.

An embodiment of the appliance in accordance with the invention is adapted to block the application of the auxiliary fluid. Thus, application of an unsuitable auxiliary fluid is precluded.

In another embodiment of the appliance in accordance with the invention is the treatment device is adapted to carry out a treatment which does not require an auxiliary fluid, and the blocking device is adapted to allow this treatment if no cartridge has been mounted. This embodiment is particularly interesting if the treatment is possible both "dry", i.e. without an auxiliary fluid, and "wet", i.e. with an auxiliary fluid. In such a case said measure precludes the application of an unfit auxiliary fluid, for example, in that the pump is blocked while allowing the appliance to be used in the "dry" mode.

In another embodiment of the appliance in accordance with the invention, the blocking device comprises: at least one blocking element which blocks the function in a blocking position and which allows the function in a non-blocking position, and at least one contact surface for positioning the blocking element by means of a key surface. This embodiment is particularly suitable for blocking mechanical functions such as, for example, the actuation of a valve or the drive of a pump. In addition, this embodiment has the advantage that it is comparatively immune to soiling. Such a soiling is for example not unlikely to be caused by the auxiliary fluid. Moreover, this embodiment is not dependent upon an electric power source, which precludes failure of the blocking device due to, for example, an inadequate battery voltage.

In another embodiment of the appliance in accordance with the invention, the contact surface is only accessible via an opening in a wall of the appliance. As a result of this measure, it is achieved that both the size and the position of a pin-shaped projection form variables for defining different keys. As a result of this, a body care system can include cartridges with mutually different fluids and different keys. It may then be desirable to block different functions in the appliances of the system in dependence on the key. A key having two different variables enables new appliances and fluids to be put on the market with the possibility of allowing operation of old appliances in combination with the new fluids and blocking new appliances for the old fluids, or of blocking the old appliances for the new fluid and allowing operation of the new appliances for the old fluids.

In another embodiment of the appliance in accordance with the inventions the the appliance has a coupling element for the passage of the auxiliary fluid, and the blocking device is constructed to be symmetrical with respect to the coupling element. Such a symmetry simplifies mounting of the cartridge on the appliance because the cartridge can be coupled to the appliance in two positions.

In a preferred embodiment of the appliance in accordance with the invention, the the blocking device comprises an optical detector for detecting an optical key on a cartridge which has been coupled to the appliance, and the blocking device has a control unit coupled to the detector. The key may then comprise, for example, a pattern of more reflecting and less reflecting surfaces which is read out when the cartridge is placed into the appliance. By means of this measure it is achieved that no forces occur between the cartridge and the appliance as a result of the presence of the key.

In another embodiment of the appliance in accordance with the invention, the the blocking device comprises a magnetic detector or an electromagnetic detector for detecting a magnetic key or electromagnetic key on a cartridge coupled to the appliance, and the blocking device has a control unit coupled to the detector. By means of these measures it is achieved that the detection of the key is not susceptible to soiling by the auxiliary fluid. The key can, for example, take the form of a magnetic strip, the magnetic detector being sensitive to a magnetic pattern provided in the magnetic strip. Alternatively, the key may include an inductive element and the magnetic detector may include an antenna for the generation and detection of an alternating magnetic field.

In yet another embodiment of the appliance in accordance with the invention, the blocking device comprising at least two electrodes for engagement with contact surfaces of a cartridge coupled to the appliance, and the blocking device comprises a control unit coupled to the electrodes. Due to this measure it is achieved that an electrically controlled function of the appliance can be blocked by simple means. The key may then comprise a pattern of electrode surfaces, connected or not connected to one another, and the electrical detector may comprise a pattern of two or more electrodes. The electrode surfaces may then be connected via a given electrical resistance, capacitance or inductance, or they may form a digital pattern of surfaces, electrically connected or not electrically connected to one another.

A preferred embodiment of the cartridge in accordance with the invention, includes a key having at least one pin-shaped projection whose position and length define the key. Due to these measures the shape of the key is non-critical, so that it can be manufactured reliably in a mass-production process.

In especially preferred embodiment of the cartridge in accordance with the invention, the key comprises at least two pin-shaped projections. By means of this measure it is achieved that the number of variables for the defining the key further increases.

Preferably, of the cartridge comprises a coupling element for the passage of the auxiliary fluid, and the pin-shaped projections are arranged symmetrically with respect to the coupling element. As a result of this, mounting of the cartridge on the appliance is simplified because the cartridge can be coupled to the appliance in two positions.

In another embodiment of the cartridge in accordance with the invention, the the cartridge comprises a reservoir and a pump, and the key forms part of the pump. By incorporating the pump in the cartridge it is achieved that the pump can be replaced easily. The hygiene of the system can be improved by, for example, selling a package including five reservoirs and one pump. When the key forms part of the pump the package as a whole can be manufactured more cheaply.

BRIEF DESCRIPTION OF THE DRAWINGS

The invention will now be described in more detail, by way of example, with reference to the drawings, in which.

DESCRIPION OF THE PREFERRED EMBODIMENTS

Figure 1:
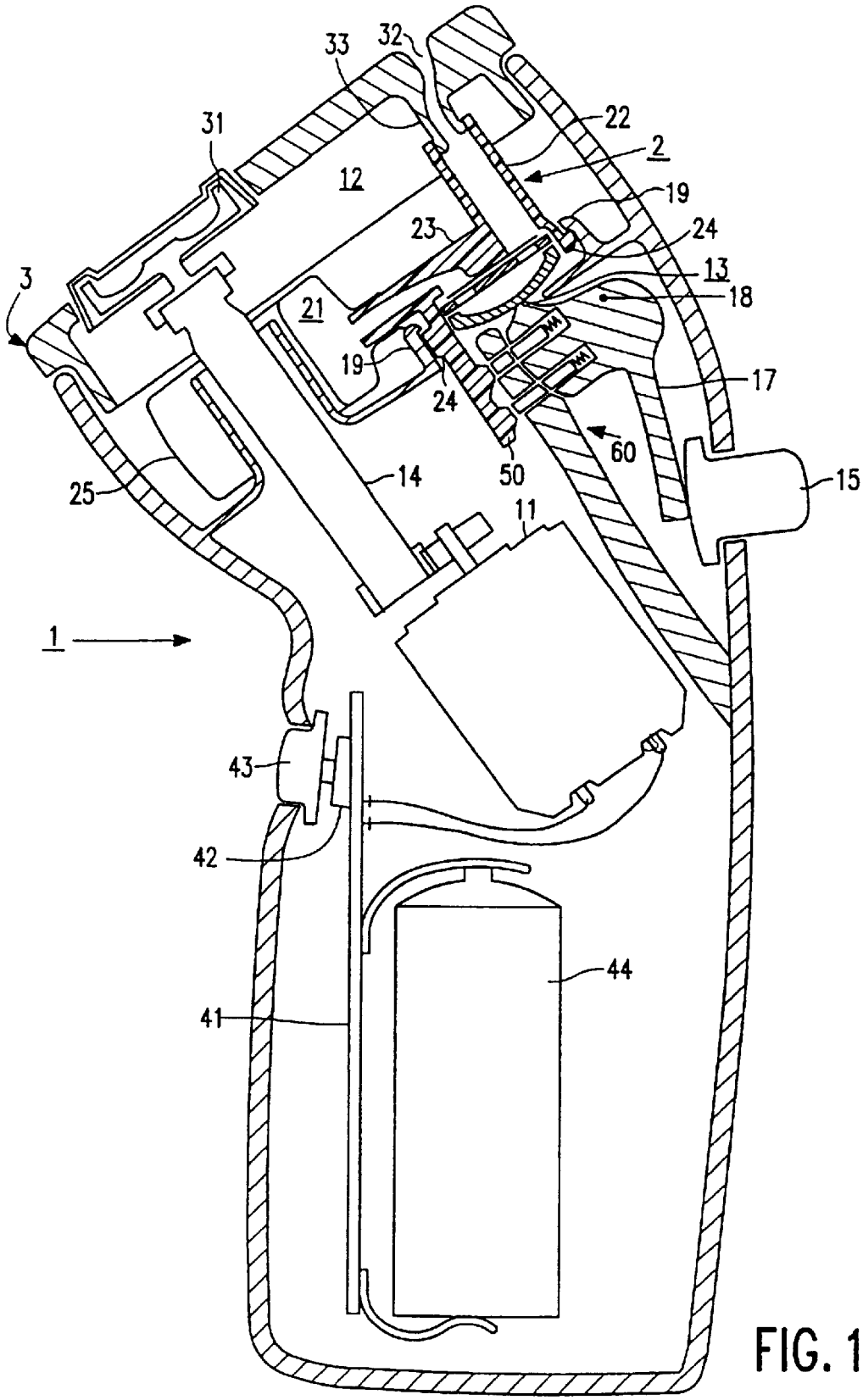
FIG. 1 is a sectional view showing a first embodiment of the system in accordance with the invention.

FIG. 1 shows a first embodiment of the system in accordance with the invention. The system comprises an electric shaver 1 and a cartridge 2 accommodated in a chamber 12 of the shaver 1. The shaver 1 comprises a treatment device, in the present case a shaving head 3 having drivable cutters 31 and an electric motor 11 for driving the cutters 31 via a coupling pin 14. The cartridge 2 comprises a diaphragm pump 23 and a reservoir 25 having a space 21 for holding an auxiliary fluid. This auxiliary fluid preferably has a lubrication component for reducing the friction between the shaving head 3 and the skin of a user and is preferably a shaving lotion. The cartridge 2 has an outlet channel 22 for applying the auxiliary fluid. The shaver 1 further has an interface for coupling the cartridge 2. The interface of the shaver 1 comprises hooks 19 which engage with hooks 24 of an interface of the cartridge 2. The hooks 19 and 24 have been shaped in such a manner that mounting and removal of the cartridge 2 requires some effort. The interface of the shaver 1 further comprises a coupling element for the passage of the auxiliary fluid, in the present case a tubular portion 33, for coupling an outlet opening 32 to the outlet channel 22. For the actuation of the diaphragm pump 23 the shaver 1 comprises an actuator 13, which extends into the chamber 12. By means of a mechanism, in the present case a lever 17 which is pivotable about a pivot 18, the actuator 13 is coupled to a button 15 on the outside of the shaver 1, in such a manner that the actuator 13 can be driven by moving the button 15. When the button is pressed the diaphragm pump 23 supplies a small amount of the auxiliary fluid via the outlet opening 32.

The cartridge 2 has a mechanical key 50 which cooperates with a blocking device 60, which is adapted to block the lever 17 via pins. The key 50 has projections for positioning the pins of the blocking device 60. The dimensions of the projections determine whether or not the pins of the blocking device 60 block the actuation of the pump 23. In the absence of the correct key the lever 17 is blocked and thus prevents the auxiliary fluid in the cartridge from being pumped to the outlet opening 32.

The shaver 1 further has a battery 44, which can be coupled to the motor 11 via a switch 42 mounted on a printed circuit board 41. The switch 42 can be actuated by means of a button 43 on the outside of the shaver 1. In the illustrated embodiment in FIG. 1, no auxiliary fluid is needed for shaving and the blocking device 60 allows shaving if no cartridge is present.

Figure 2:
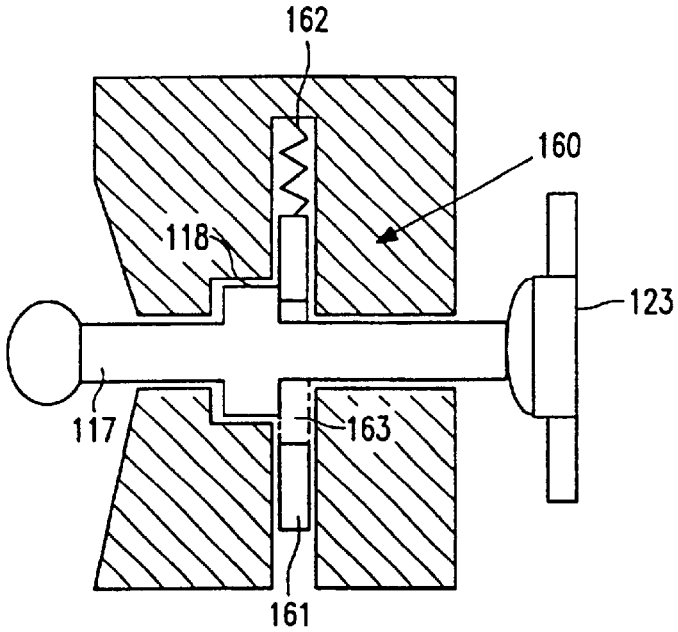
FIG. 2 is a diagrammatic representation of a part of a second embodiment of the invention, in which an actuating function is blocked.

FIG. 2 is a diagrammatic representation of a part of a second embodiment of the invention, in which an actuating function is blocked. In this embodiment a slide 117 for the actuation of a pump 123 is blocked by means of a blocking device 160. The blocking device 160 further comprises a blocking element 161, which is held in a blocking position by a resilient element 162. In this blocking position the actuation of the pump is blocked in that the blocking element 161 forms a stop for a projection 118 on the slide 117. The advantage of mechanically blocking the slide 117 is that the user feels that the pump function is blocked. Thus, it is avoided that he draws the conclusion that the cartridge is empty or that clogging has occurred.

Figure 3:
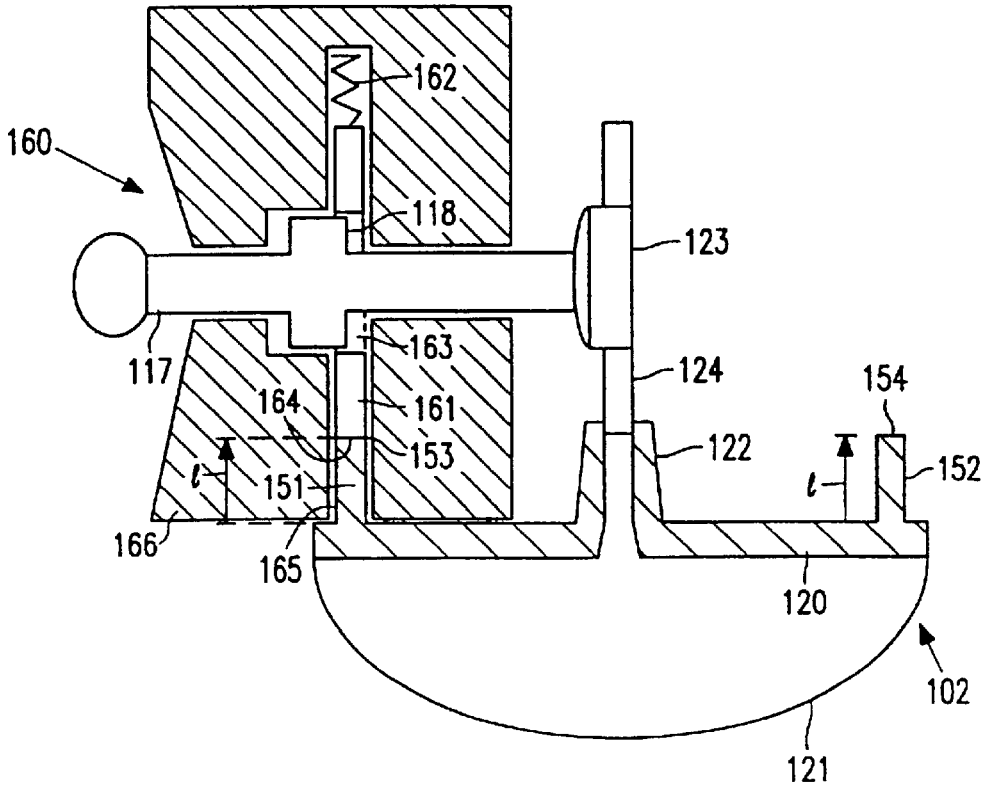
FIG. 3 is a diagrammatic representation of a part of the second embodiment of the invention, in which an actuating function is not blocked.

FIG. 3 is a diagrammatic representation of a part of the second embodiment of the invention, in which the actuating function is not blocked. In a non-blocldng position of the blocking element 161 an opening 163 in the blocking element 161 is positioned in such a manner that the projection 118 is free and the pump 123 can be actuated via the slide 117. The blocking element 161 is moved into the non-blocking position by a key which forms part of a cartridge 102. The cartridge 102 holds an auxiliary fluid, which is enclosed by the flange 120 and a flexible wall 121. The flange 120 has a coupling element 122 for the passage of the auxiliary fluid. The key comprises a pin 151 whose position on the flange corresponds to that of an opening 165 of the blocking device 160 when the coupling element 122 is in line with a coupling element 124 of the pump 123. The key has a key surface 153 which engages against a contact surface 164 of the blocking element 161. The pin 151 has a such a length 1 that the blocking element 161 is held in its non-blocking position against the pressure of the resilient element 162. The key on the cartridge 102 comprises a second pin 152 having the same length as the pin 151. The second pin 152 likewise has a key surface adapted to cooperate with the contact surface 164. The pins 151 and 152 are disposed symmetrically with respect to the coupling element 122. As a result of this symmetry the cartridge 102 can be mounted in two different positions which are spaced 180 degrees apart.

Figure 4:
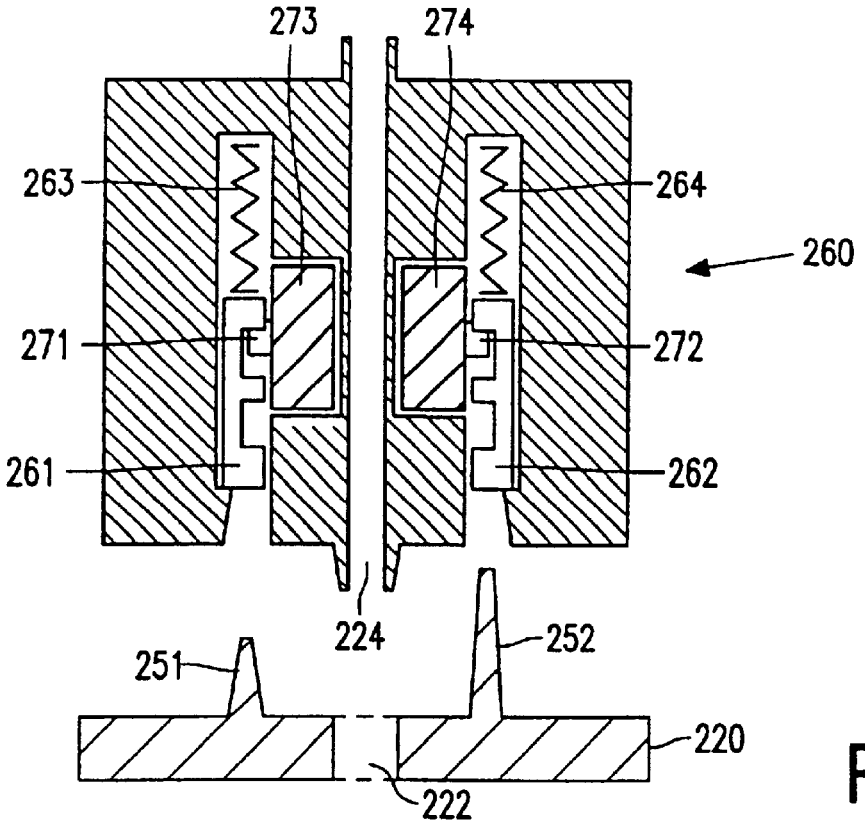
FIG. 4 is a diagrammatic representation of a part of a third embodiment of the invention.

FIG. 4 is a diagrammatic representation of a part of a third embodiment of the invention. In this embodiment the key comprises two pins 251 and 252 arranged symmetrically with respect to a coupling element 222. The pins 251 and 252 form parts of a flange 220 which is connected to a flexible pouch, not shown. The blocking device 260 comprises two blocking elements 261 and 262 held in a blocking position by two springs 263 and 264. In this blocking position the blocking elements 261 and 262 block two projections 271 and 272 which form parts of actuating slides 273 and 274, so that the functions controlled by the actuating slides 273 and 274 are blocked. The slides 271 and 272 may be coupled in such a manner that both slides should not be blocked to actuate a function. The blocking elements 271 and 272 may be coupled in such a way that the presence of one of the two pins 251 and 252 is adequate to set the blocking elements 271 and 272 to a non-blocking position.

Figure 5:
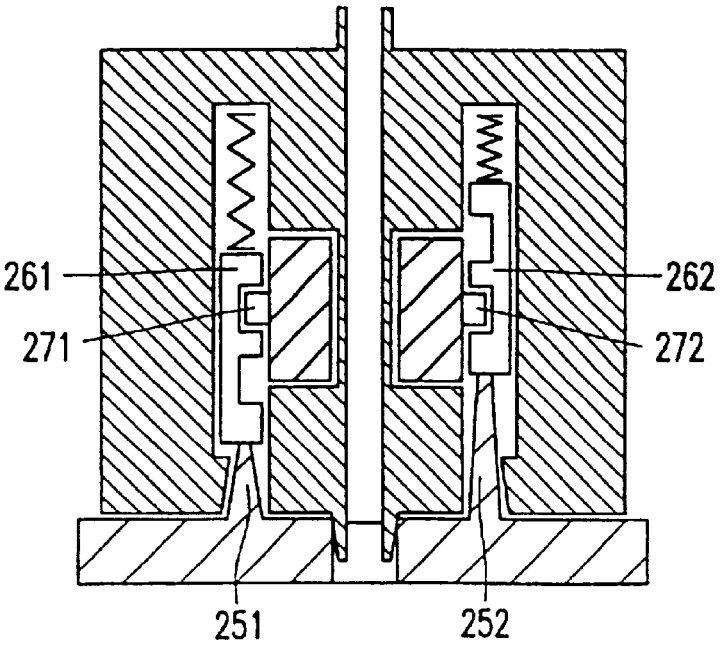
FIG. 5 is a diagrammatic representation of a part of the third embodiment of the invention, in which a flange in a first position cooperates with a blocking device.

FIG. 5 is a diagrammatic representation of a part of the third embodiment of the invention, in which the flange 220 in a first position cooperates with the blocking device 260 and said functions are not blocked. In the non-blocking positions of the blocking elements 261 and 262 the projections 271 and 272 are free, so that the actuating slides 273 and 274 can be moved in a direction perpendicular to the plane of drawing.

Figure 6:
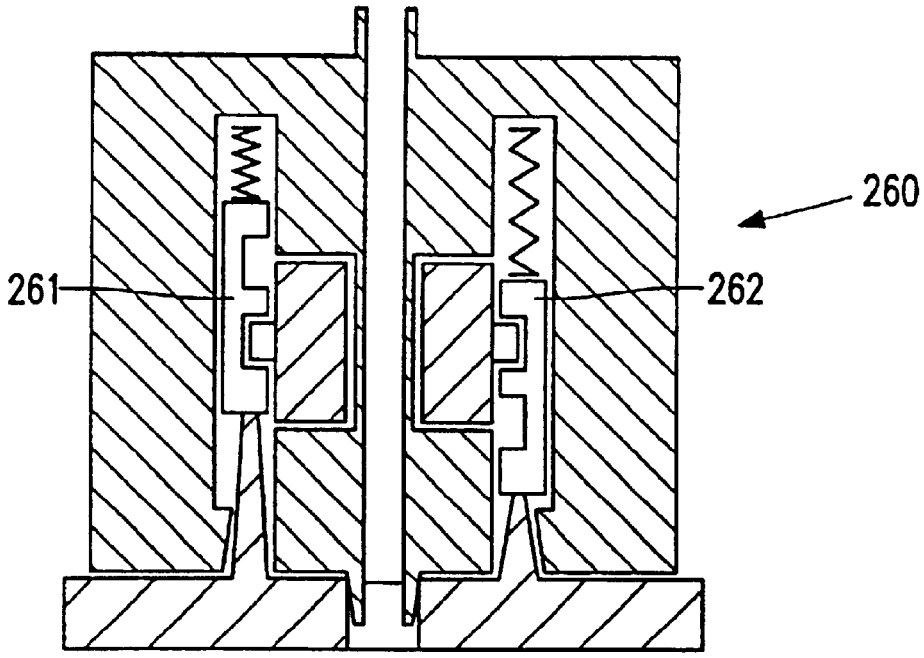
FIG. 6 is a diagrammatic representation of a part of the third embodiment of the invention, in which the flange in a second position cooperates with a blocking device.

FIG. 6 is a diagrammatic representation of a part of the third embodiment of the invention, in which the flange 220 in a second position cooperates with the blocking device 260 and in which said functions are not blocked. In the third embodiment the blocking device 260 is symmetrical and each blocking element has two non-blocking positions. As a result of this, the flange 220 can be mounted in tow different positions which are 180 degrees spaced apart, while the key is asymmetrical. The blocking device 260 is also unblocked by a key having two pins of a length equal to that of the pin 251 or of the pin 252. As a result, it is possible to market different cartridges with different keys and different fluids, which all unblock the blocking device 260, and to market appliances which comprise blocking elements having one opening for the passage of one projection, so that these are unblocked for only one of these keys.

Figure 7:
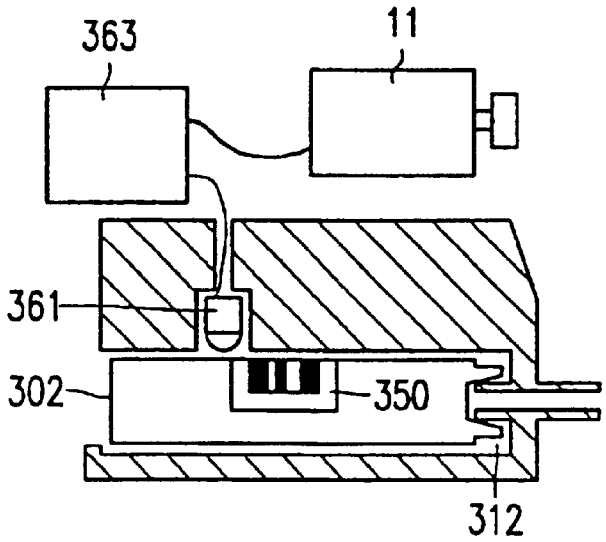
FIG. 7 shows a part of an embodiment having an optical key and an optical detector.

FIG. 7 shows a part of an embodiment having an optical key and an optical detector. In this embodiment a cartridge 302 has a bar code 350 which can be read by an optical detector 361 when the cartridge is placed into a suitable chamber 312 in an appliance in accordance with the invention. The appliance further comprises a control unit 363 including a detection circuit. The control unit wholly or partly enables the drive to be applied to a motor 11 upon detection of the correct bar code. The motor 11 serves, for example, for driving cutters as shown in FIG. 1.

Figure 8:
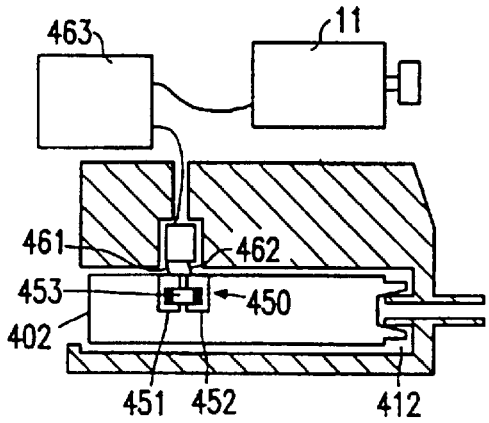
FIG. 8 shows a part of an embodiment having an electrical key and an electrical detector.

FIG. 8 shows a part of an embodiment having an electrical key and an electrical detector. In this embodiment a cartridge 402 has two contact surfaces 451 and 452 interconnected via a resistor 453 having a given resistance value. When the cartridge is present in a chamber 412 of an appliance in accordance with the invention this resistance value can be measured by means of a measurement circuit of a control unit 463 and two electrodes 461 and 462. Upon detection of given resistance values certain speeds of the motor 11 are no longer inhibited.

Figure 9:
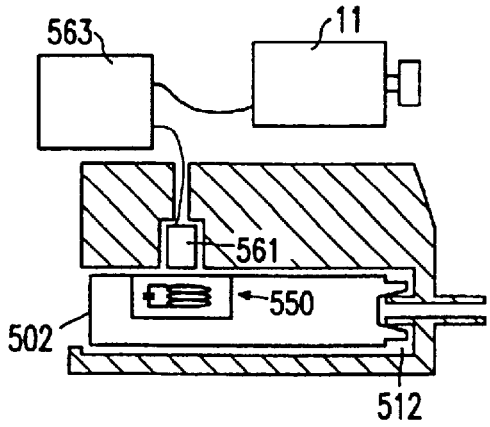
FIG. 9 shows a part of an embodiment having an electromagnetic key and an electromagnetic detector.

FIG. 9 shows a part of an embodiment having an electromagnetic key and an electromagnetic detector. In this embodiment a cartridge 502 comprises a resonant circuit 550, which can be read out by means of an antenna 561 when the cartridge 502 is present in a suitable chamber 512 in an appliance in accordance with the invention. The appliance further comprises a control unit 563 having a decoder circuit which wholly or partly enables the drive to be applied to a motor 11 upon detection of the correct resonant frequency.

Figure 10:
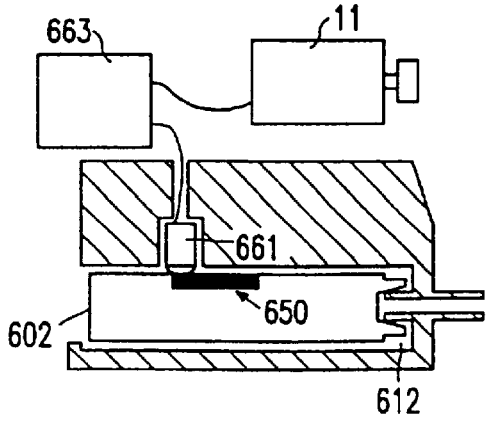
FIG. 10 shows a part of an embodiment having a magnetic key and a magnetic head.

FIG. 10 shows a part of an embodiment having a magnetic key and a magnetic head. In this embodiment a cartridge 602 has a magnetic strip 650 which can be read out by means of a magnetic head 661 when the cartridge is placed into a suitable chamber 612 in an appliance in accordance with the invention. The appliance further comprises a control unit 663 having a decoder circuit which wholly or partly enables the drive to be applied to a motor 11 upon detection of the correct code on the magnetic strip.

It is to be noted that the invention is not limited to said embodiments. The blockable function can also involve a treatment of a given type or a give treatment speed. For example, in the case of a massaging device the auxiliary fluid may be a massaging oil, a higher massaging speed being allowed when a cartridge having the correct key is present. Thus, it is possible to preclude an undesirable effect of an unsuitable auxiliary fluid on, for example, the skin of a user in combination with that given treatment or treatment speed. Besides, the appliance can be constructed as an electric toothbrush, a depilation device or a steaming device, the auxiliary fluid being, for example, a toothpaste, a body-care cream or a menthol preparation.

What is claimed is:

1. An appliance for body care, comprising a treatment device for carrying out a treatment on the body of a user, and an interface for coupling a cartridge to the appliance, which cartridge has a space for storing an auxiliary fluid, wherein:

the appliance includes a blocking device adapted to block at least one function of the appliance, the blocking device is adapted to unblock said function when a cartridge having a key is coupled to the appliance, and the blocking device comprises an optical detector for detecting an optical key on a cartridge which has been coupled to the appliance, and a control unit coupled to the detector.

2. An appliance for body care, comprising a treatment device for carrying out a treatment on the body of a user, and an interface for coupling a cartridge to the appliance, which cartridge has a space for storing an auxiliary fluid, wherein:

the appliance includes a blocking device adapted to block at least one function of the appliance, the blocking device is adapted to unblock said function when a cartridge having a key is coupled to the appliance, and the blocking device comprises a magnetic detector or an electromagnetic detector for detecting a magnetic key or electromagnetic key on a cartridge coupled to the appliance, and a control unit coupled to the detector.

3. An appliance for body care, comprising a treatment device for carrying out a treatment on the body of a user, and an interface for coupling a cartridge to the appliance, which cartridge has a space for storing an auxiliary fluid, wherein:

the appliance includes a blocking device adapted to block at least one function of the appliance, the blocking device is adapted to unblock said function when a cartridge having a key is coupled to the appliance, and the blocking device comprises at least two electrodes for engagement with contact surfaces of a cartridge coupled to the appliance, and a control unit coupled to the electrodes.

4. A cartridge comprising a space for the storage of an auxiliary fluid intended for personal body care in conjunction with a body-care treatment, an interface for coupling the cartridge to an appliance adapted to carry out said treatment, wherein the cartridge has a key for unblocking a function of the appliance when the cartridge is coupled to the appliance, said key comprising an optical key.

5. A cartridge comprising a space for the storage of an auxiliary fluid intended for personal body care in conjunction with a body-care treatment, an interface for coupling the cartridge to an appliance adapted to carry out said treatment, wherein the cartridge has a key for unblocking a function of the appliance when the cartridge is coupled to the appliance, said key comprising a magnetic key or an electromagnetic key.

6. An appliance for body care, comprising a treatment device for carrying out a treatment on the body of a user, and an interface for coupling a cartridge to the appliance, which cartridge comprises a key with projections, a diaphragm pump, a space for storing an auxiliary fluid, and an outlet for applying the auxiliary fluid, wherein:

the appliance includes an actuating mechanism which is coupled to the pump and a blocking device adapted to block the actuation of the pump by the actuating mechanism, the blocking device comprising projections which, when the cartridge having a key with projections is coupled to the appliance, cooperate with the projections of the key, the dimensions of the projections of the cartridge and key determining whether the actuating mechanism is blocked or unblocked.

7. An appliance for body care, comprising a treatment device for carrying out a treatment on the body of a user, and an interface for coupling a cartridge to the appliance, which cartridge comprises a key with projections, a diaphragm pump, a space for storing an auxiliary fluid, and an outlet for applying the auxiliary fluid, wherein:

the appliance includes an actuating mechanism which is coupled to the pump and a blocking device adapted to block the actuation of the pump by the actuating mechanism, the blocking device comprising projections which, when the cartridge having a key with projections is coupled to the appliance, cooperate with the projections of the key, the dimensions of the projections of the cartridge and key to block or unblock the actuation of the pump and prevent the auxiliary fluid in the cartridge from being pumped to the outlet, the blocking device being effective to determine whether the actuating mechanism is blocked or unblocked.

8. A cartridge comprising a space for the storage of an auxiliary fluid intended for personal body care in conjunction with a body-care treatment, an interface for coupling the cartridge to an appliance adapted to carry out said treatment, wherein the cartridge has a key for unblocking a function of the appliance when the cartridge is coupled to the appliance, said key comprising at least two contact surfaces between which an electrical element is arranged.

9. An appliance for body care, comprising a treatment device for carrying out a treatment on the body of a user, and an interface for coupling a cartridge to the appliance, which cartridge comprises a key with at least two contact surfaces between which an electrical element is arranged, a diaphragm pump, a space for storing an auxiliary fluid, and an outlet for applying the auxiliary fluid, wherein:

the appliance includes an actuating mechanism which is coupled to the pump and a blocking device adapted to block the actuation of the pump by the actuating mechanism, the blocking device comprises at least two electrodes which, when the cartridge having said key with contact surfaces is coupled to the appliance, cooperates with the contact surfaces of the key, determining whether the actuating mechanism is blocked or unblocked.

10. A cartridge comprising:

a space for the storage of an auxiliary fluid intended for personal body care in conjunction with a body-care treatment, an interface for coupling the cartridge to an appliance adapted to carry out said treatment, the cartridge having a key for unblocking a function of the appliance when the cartridge is coupled to the appliance, wherein the cartridge comprises a reservoir and a pump, and the key forms part of the pump.

11. A cartridge comprising:

a space for the storage of an auxiliary fluid intended for personal body care in conjunction with a body-care treatment, an interface for coupling the cartridge to an appliance adapted to carry out said treatment, the cartridge having a key for unblocking a function of the appliance when the cartridge is coupled to the appliance, wherein the cartridge comprises a reservoir and a pump, and the pump is detachable from the reservoir.

*12. A fluid-storing cartridge for a personal care appliance, comprising:*

*a cartridge member having a space therein for storing fluid for use in operation of a personal care appliance, wherein the cartridge is adapted to be removably securable to the personal care appliance;*

*wherein the cartridge includes a key member which cooperates with an assembly in the personal care appliance in such a manner that when the cartridge member is not operatively positioned in the personal care appliance, the assembly operates to block operation of a fluid dispersing assembly in the appliance, and when the cartridge is operatively positioned in the personal care assembly, operation of the fluid dispensing assembly is unblocked, permitting the dispensing of fluid from the cartridge member.*

*13. A cartridge of claim 12, wherein the personal care appliance is an electric toothbrush.*

*14. A fluid-storing cartridge for a personal care appliance, comprising:*

*a cartridge member having a space therein for storing fluid for use in operation of a personal care appliance, wherein the cartridge is adapted to be removably securable to the personal care appliance;*

*wherein the cartridge includes a key for unblocking a function of the appliance upon coupling of the cartridge to the appliance and wherein a blocking device in the personal care appliance blocks the function of the appliance when the cartridge is removed from the appliance.*

*15. A cartridge of claim 14, wherein the appliance is an electric toothbrush and the function of the appliance is movement of fluid from the cartridge out of the toothbrush.*

*16. An element for coupling a cartridge member containing a fluid to a personal care appliance, comprising:*

*a flange which is adapted to couple a fluid-containing cartridge to a personal care appliance, wherein the flange includes a key which cooperates with an assembly in the personal care appliance in such a manner that when the flange with the coupled cartridge is not operatively positioned in the personal care appliance, the assembly operates to block operation of a fluid dispensing assembly in the appliance and when the flange with the coupled cartridge is operatively positioned in the personal care assembly, operation of the fluid dispensing assembly is unblocked, permitting the dispensing of fluid from the cartridge.*

*17. An element of claim 16, wherein the personal care appliance is an electric toothbrush.*

*18. A flange for coupling a fluid-storing cartridge to a personal care appliance comprising:*

*a flanged adapted to couple a fluid-containing cartridge to a personal care appliance, wherein the flange includes a key for unblocking a function of the appliance upon coupling of the cartridge to the appliance and wherein a blocking device in the personal care appliance blocks the function of the appliance when the cartridge is removed from the appliance.*

* * * * *